Oct. 11, 1938.    E. R. BERGMANN    2,132,718
FEEDING MECHANISM FOR SHAKER CONVEYERS
Original Filed Feb. 6, 1936    3 Sheets-Sheet 1
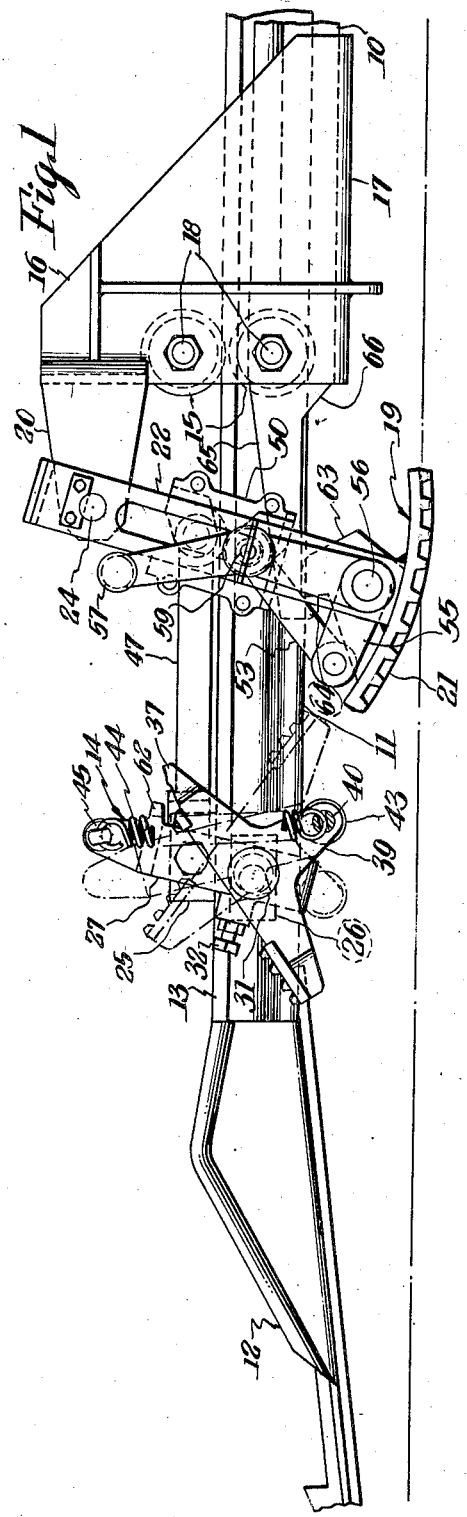
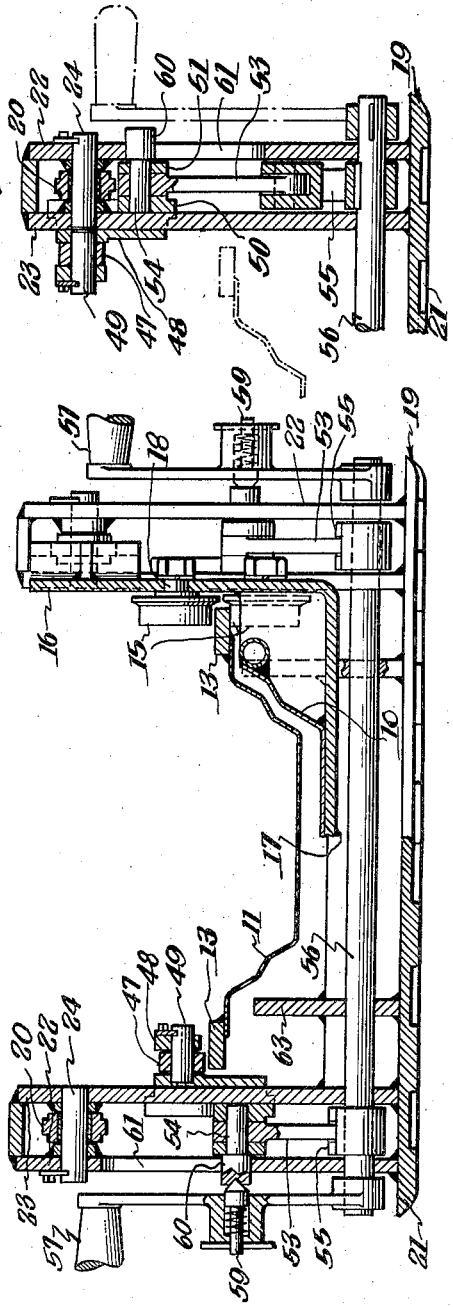
Inventor
Ernst R. Bergmann
Clarence F. Poole
Attorney.

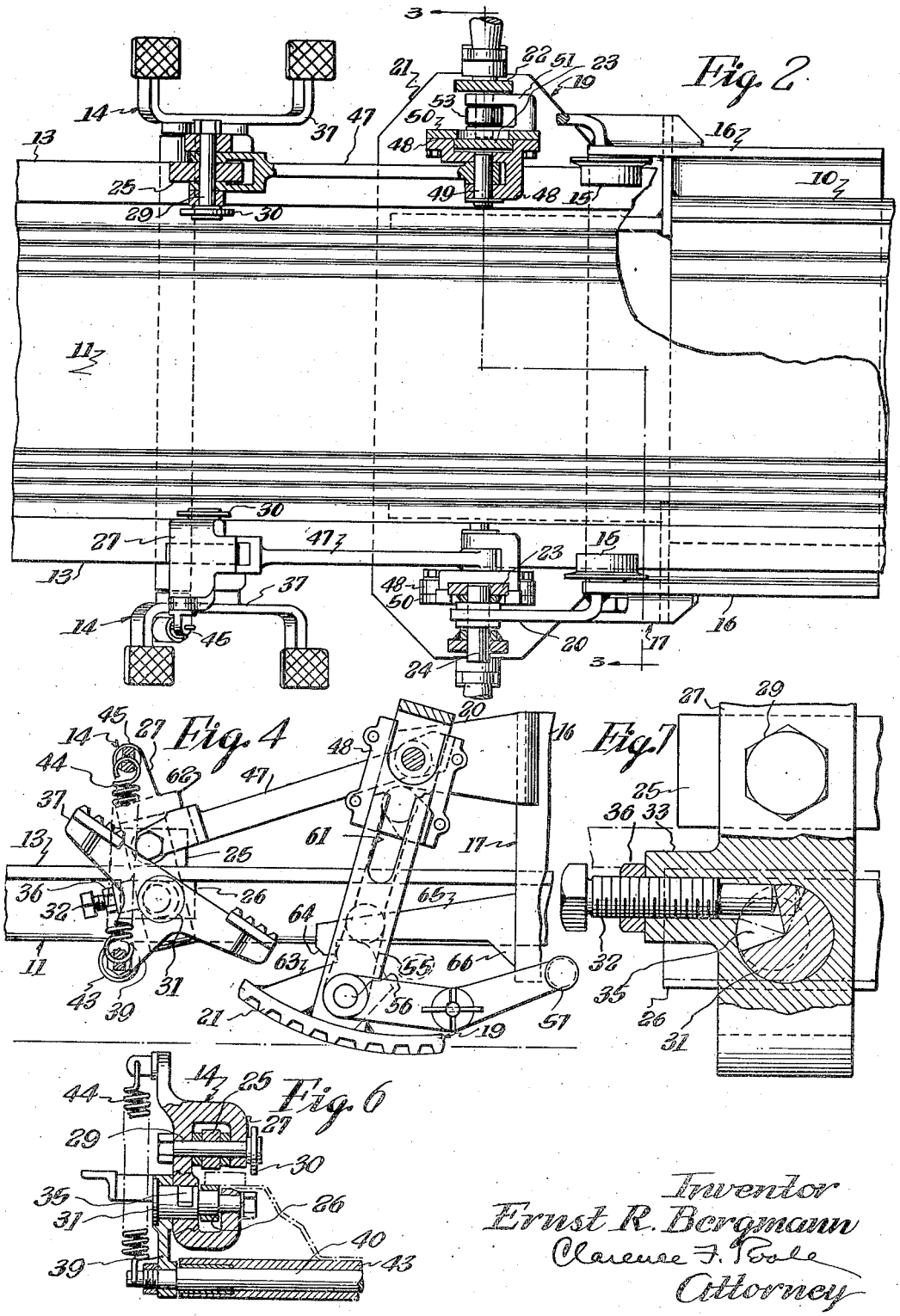

Oct. 11, 1938.    E. R. BERGMANN    2,132,718
FEEDING MECHANISM FOR SHAKER CONVEYERS
Original Filed Feb. 6, 1936    3 Sheets—Sheet 3
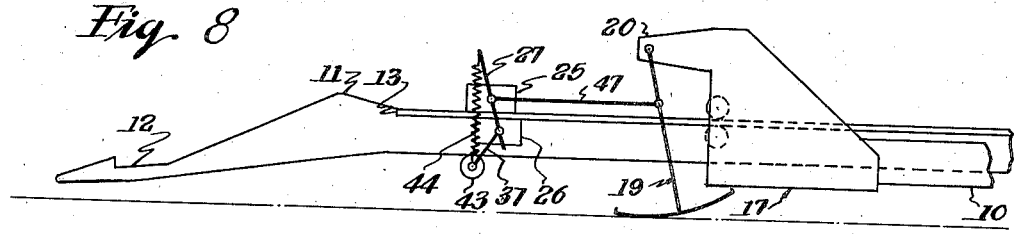
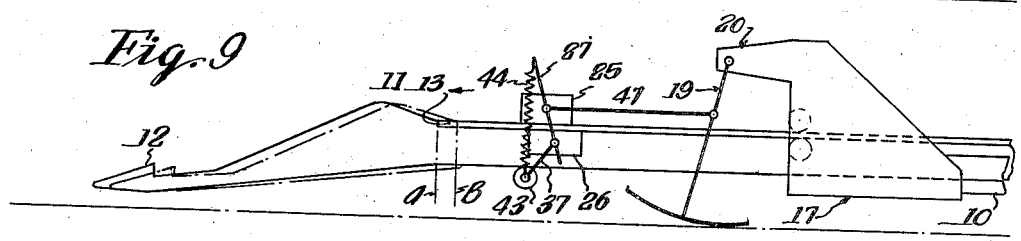
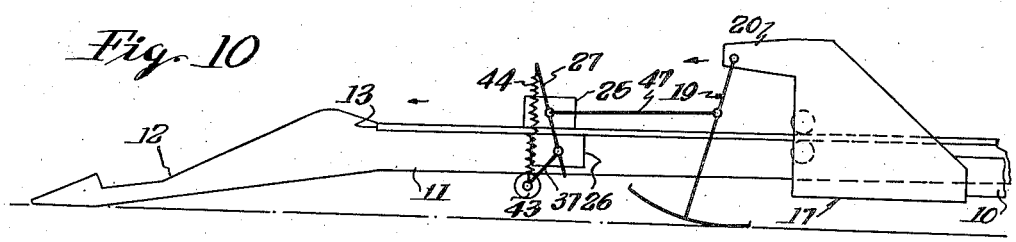
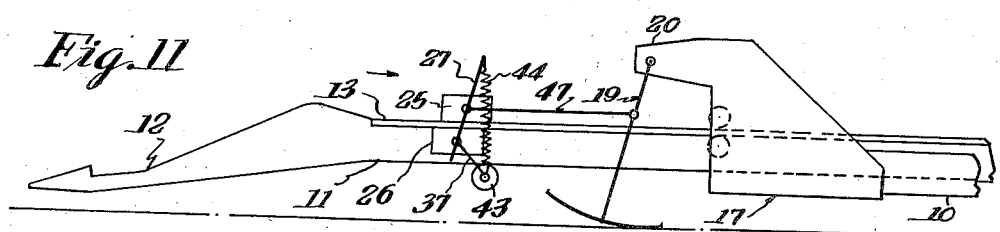
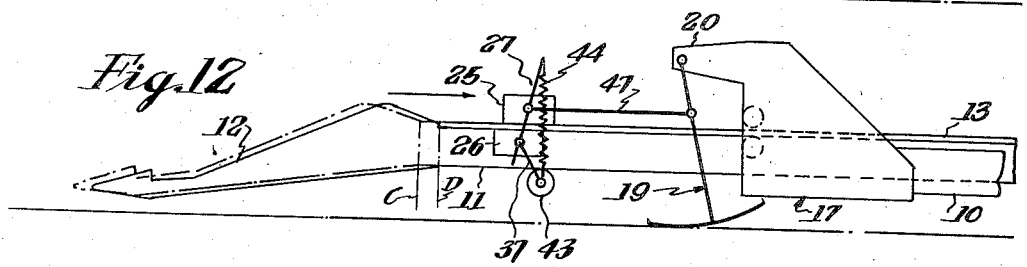
Inventor
Ernst R. Bergmann
Clarence F. Poole
Attorney Patented Oct. 11, 1938

2,132,718

UNITED STATES PATENT OFFICE 2,132,718

FEEDING MECHANISM FOR SHAKER CONVEYERS

Ernst R. Bergmann, Chicago, Ill., assignor to Goodman Manufacturing Company, Chicago, Ill., a corporation of Illinois Application February 6, 1936, Serial No. 62,582
Renewed April 15, 1937

27 Claims. (Cl. 198—220)

This invention relates to improvements in feeding mechanisms for shaker conveyers of the type utilized for gathering and transporting loose material such as coal, rock or the like.

More specifically my invention relates to improvements in the construction of feeding mechanisms attached to the loading end of reciprocating conveyers and has as its principal objects to provide a novel arrangement of feeding mechanism of a simplified construction, so arranged that the extension or retraction of an extensible trough section having a gathering shovel at the forward end thereof may be effected by the reciprocating action of the conveyer.

The device of my invention operates on principles similar to those disclosed in an application, Serial No. 36,496, filed by Louis F. Jones, August 16, 1935, which is now Patent No. 2,068,953, but differs therefrom in the arrangement of the mechanism and operation of the gripping devices for extending or retracting the extensible trough section.

My invention may best be understood with reference to the accompanying drawings wherein:

Figure 1 is a side elevation of a feeding mechanism constructed in accordance with my invention;

Figure 2 is a fragmentary plan view of the device shown in Figure 1, with certain parts broken away and shown in horizontal section to more clearly illustrate certain details of my invention;

Figure 3 is a transverse sectional view taken substantially along lines 3—3 of Figure 2;

Figure 4 is a fragmentary detail side elevational view of the feeding mechanism with the parts positioned differently than in Figure 1, and with certain parts broken away and shown in section in order to illustrate certain details of the invention not shown in Figure 1;

Figure 5 is an enlarged fragmentary transverse sectional view taken through the rocking shoe with the parts positioned as shown in Figure 4;

Figure 6 is an enlarged fragmentary transverse sectional view taken through the gripping devices;

Figure 7 is an enlarged fragmentary sectional view illustrating the details of the means for adjusting the spacing of the gripping blocks; and Figures 8, 9, 10, 11 and 12 are diagrammatic views of the feeding mechanism showing certain operating positions thereof.

In the drawings the main elements of the embodiment of my invention illustrated consist of a reciprocating trough section 10 connected to the forward end of a reciprocating shaker conveyer pan line (not shown) of a usual construction. An extensible trough section or pick-up member 11 having a flared gathering shovel 12 at the forward end thereof extends from said reciprocating trough section and is adapted to be nested therein for extension or retraction with respect thereto.

The extensible trough section 11 is provided with a pair of laterally extending bearing plates 13 secured to and extending outwardly from the upper flanges thereof. Said bearing plates are adapted to be engaged by a feeding mechanism, generally indicated by reference character 14, for extending or retracting said pick-up member with respect to said reciprocating trough section.

Said bearing plates are slidably mounted between a pair of spaced rollers 15, 15 mounted on opposite side walls 16, 16 of a support bracket 17 on suitable parallel-spaced studs 18, 18. Said support bracket is secured to the forward end of the reciprocating trough section 10 and extends along the bottom thereof and upwardly along opposite sides thereof, and said rollers are adapted to form an anti-friction supporting and guiding means for said bearing plates and prevent lateral and vertical displacement of said pick-up member with respect to said reciprocating trough section (see Figures 1 and 2).

The forward end of said reciprocating trough section is supported on a rocking shoe 19. Said rocking shoe is pivotally mounted forwardly of the trough section 10 on a pair of brackets 20, 20 disposed above said trough section and which as herein shown are formed integrally with and extend forwardly from the upper ends of the vertical side walls of the support member 17. Said rocking shoe, as herein shown, includes an arcuate ground engaging plate 21 having suitable lugs or cleats on the under surface thereof. Suitable spaced-apart legs consisting of outer upstanding members 22, 22 and corresponding inwardly spaced inner members 23, 23 are herein shown as being welded to the upper surface of said plate and extend upwardly therefrom adjacent opposite sides thereof. Said members are connected together at their upper ends by means of a suitable tie piece. The forward end of each of the brackets 20 extends between each pair of said upstanding members and is pivotally connected thereto adjacent the upper ends thereof by means of a pivotal pin 24, as is best shown in Figures 3 and 5.

Referring now in particular to the novel arrangement of the feeding mechanism 14 and the operating means for said feeding mechanism which is actuated by the rocking shoe 19, said feeding mechanism as herein shown consists of two sets of friction blocks 25 and 26, each of which sets is mounted in a carrier member 27 of a substantially C-shaped formation (see Figure 6). One carrier member is provided at each side of the extensible trough 11 and is supported thereby in advance of the reciprocating trough section 10, and since the construction of each carrier member and the means for operating and controlling operation thereof is similar, a description of one will suffice for both.

The carrier member 27 is so arranged that its open end extends inwardly along the bearing plate 13 so the friction blocks 25 and 26 may engage the upper and lower surfaces of said bearing plate, respectively.

The upper friction block 25 is mounted in said carrier member on a bolt 29 which has a retaining roller 30 mounted on the inner end thereof adapted to engage the inner side of the bearing plate 13.

The lower friction block 26 is pivotally mounted on a suitable eccentric member 31 eccentrically of the center thereof. Said eccentric member is herein shown as extending through both sides of said carrier member and having a nut threaded on its inner end (see Figure 6). The arrangement of said eccentric member is such that rotation thereof in one direction or another will vary the spacing of the friction block 26 with respect to the friction block 25 to provide an adjustment to take care of wear of said blocks.

The eccentric member 31 is herein shown as being turned or held in position by means of a machine screw 32 threaded within a lug 33 formed integral with said carrier member, as shown in Figure 7. The inner end of said screw is adapted to engage one wall of a slot 35 formed in said eccentric member, which slot is in the form of a segment of a circle. A lock nut 36 is threaded on said screw to lock it from movement when desired.

An adjusting lever 37 herein shown as being pivotally mounted on the outer end of the eccentric member 31 is provided to adjust the carrier member 27 to position the blocks 25 and 26 to extend or retract said trough section as desired and form a reaction member about which said blocks may pivot. As herein shown, said adjusting lever has forward and rearward extensions having suitable foot treadles thereon, so said lever may be conveniently operated by the foot. An arm 39 extends downwardly from the point of connection of said adjusting lever to said carrier member and is pivotally mounted on an outer end of a shaft 40. Said shaft extends transversely across said extensible trough section and affords a means whereby said carrier member may be adjusted from one side or the other of the device and also forms a reaction member for said adjusting levers. A roller 43 is mounted on said shaft and slidably engages the under side of said extensible trough section to permit sliding movement of said shaft along said extension trough as said adjusting levers are pivoted about the axis of said shaft.

Said carrier members are held in the desired position of adjustment with respect to said extensible trough section by means of suitable yieldable members 44, 44, herein shown as being tension springs. Said tension springs also serve as a means to engage said grip blocks with said bearing plates and are connected between the outer ends of the shaft 40 and suitable lugs 45, 45 extending outwardly and upwardly from said carriers.

Means are provided for simultaneously rocking the carrier members 27, 27 about the axes of pivotal connection of said lower friction blocks thereto and bringing the friction blocks 25 and 26 into and out of engagement with the bearing plates 13, 13, which as herein shown comprise actuating links 47, 47 connected between said carrier members and the rocking shoe 19. The forward ends of said links are bifurcated, and as herein shown are pivotally connected to the bolts 29, 29 on opposite sides of the grip blocks 25, 25. The rearward ends of said links are pivotally connected to opposite legs of said rocking shoe so as to move in substantially parallel relation with respect to said trough upon rocking movement of said shoe. Support brackets 48, 48 mounted for slidable adjustable movement along the inner members 23, 23 of said legs form a pivotal connecting means for the rearward ends of said links, and said links are pivotally secured between a forked portion thereof by means of pivotal pins 49, 49.

Each of the support brackets 48 engages the outer sides of the inner member 23 and is held in slidable engagement therewith by means of a bracket 50 disposed between the members 22 and 23 and secured to said support bracket by means of suitable cap screws in a usual manner. The bracket 50 has a bifurcated portion 51 disposed between the members 22, 22 which has a link 53 pivotally connected thereto on a pivotal pin 54. The lower end of said last-named link is pivotally connected to a crank arm 55 which is keyed on a shaft 56 mounted in said rocking shoe and extending transversely thereof. Said shaft is pivotally moved for adjusting the position of the rearward pivotal axes of the links 47, 47 by means of suitable hand cranks 57, 57 keyed on the outer ends thereof.

When said hand cranks are positioned as shown in Figures 1, 3 and 5, the links 47, 47 are disposed in a lowered operative position. Said hand cranks are locked in such a position by means of suitable spring pressed plungers 59, 59 mounted in said hand cranks and engaging heads 60, 60 of the pins 54, 54 which heads are slidable in slots 61, 61 formed along the outer members 22, 22.

When said hand cranks are positioned as shown in Figure 4, the rearward pivotal axes of the links 47, 47 are coaxial with the axis of rocking movement of said rocking shoe, as is best shown in Figures 4 and 5. When in such a position, there will be no appreciable movement of said links during rocking movement of said shoe, and the grip blocks 25 and 26 will be engaged with the bearing plates 13, 13 by means of the springs 44, 44. The forward portions of said links are adapted to engage lugs 62, 62 on the carrier members 27, 27 when the rearward ends of said links are in the last-named position to positively lock said grip blocks in engagement with said bearing plates.

Suitable means are provided to limit rocking movement of the rocking shoe 19 which as herein shown comprises suitable spaced-apart stop members 63, 63 extending upwardly from opposite sides of said shoe and having forward and rearward engaging faces. Said forward faces are adapted to engage stops 64, 64 on the forward ends of spaced-apart arms 65, 65 extending forwardly from the bracket member 17 and said rearward faces are adapted to engage stops 66, 66 on the rearward ends of said arms adjacent said bracket.

Referring now to Figures 8 to 12, inclusive, which illustrate the operation of the apparatus, and to Figures 8 and 9 in particular, which show the relative positions of the parts of the feeding mechanism at the beginning and end of the return stroke of the conveyer when the extensible trough 11 is resting on the reciprocating trough 10 and is out of engagement with the ground, it may be seen that the frictional resistance between said troughs is such that there is a tendency for said extensible trough to move with said reciprocating trough. When the friction grip blocks 25 and 26 are positioned as shown in these figures, the relative force exerted by the links 47, 47 against the carrier members 27, 27 during the return stroke of the conveyer is in a forward direction. This will engage the grip blocks 25 and 26 with the bearing plates 13, 13 during this period in an obvious manner. Upon the forward stroke of the conveyer the relative force exerted by the links 47, 47 against the carrier members 27, 27 will be in a rearward direction. This will disengage the grip blocks 25 and 26 from the bearing plates 13, 13. Thus, during the forward stroke of the conveyer the frictional resistance of said extensible trough section against said reciprocating trough section will be such that said troughs will move together in a forward direction a distance equal to the stroke of the conveyer, and during the return stroke of the conveyer said grip blocks will retract said extensible trough a distance equal to the length of travel of the link 47. This will result in advancing the forward end of said extensible trough section a distance substantially equal to the difference between the stroke of the conveyer and the distance the links 47, 47 travel, which distance is indicated by the space between the lines A—B in Figure 9.

When the forward end of said extensible trough is resting on the ground as in Figure 10, and the grip blocks are disengaged from said trough sections, the frictional resistance of said extensible trough against the ground is sufficient to hold said extensible trough section from movement with respect to said reciprocating trough. Thus, the direction of force exerted by the links 47, 47 is reversed from that shown in Figures 8 and 9 and the grip blocks 25 and 26 will grip the bearing plates 13, 13 upon the forward stroke of the conveyer and be disengaged therefrom upon the return stroke of the conveyer. The action of feeding is, accordingly, automatically reversed from the backward to the forward stroke of the conveyer when said extensible trough section 11 engages the ground and accumulates sufficient friction to hold it from movement with respect to said reciprocating trough section.

Figures 11 and 12 show the grip blocks positioned for retracting the extensible trough section within the reciprocating trough section when said extensible trough section is disposed above the ground. When in such a position, the grip blocks 25 and 26 are disengaged from the bearing plates 13, 13 upon the return stroke of the conveyer and engaged with said bearing plates upon the forward stroke of the conveyer. Thus, said extensible trough section will move rearwardly a distance equal to the length of stroke of said reciprocating trough section upon the return stroke of the conveyer, and will be moved forwardly by said grip blocks a distance equal to the length of travel of the links 47, 47 upon the forward stroke of the conveyer and said extensible trough section will, accordingly, be retracted within said reciprocating trough section a distance indicated by the space between the lines C—D in Figure 12.

While I have herein shown and described one form in which my invention may be embodied, it will be understood that the construction or arrangement of the various parts may be altered or changed without departing from the spirit and scope thereof. Furthermore, I do not wish to be construed as limiting myself to the particular form shown, excepting as it may be limited by the appended claims.

I claim as my invention:

1. In a feeding device for shaker conveyers, a reciprocating trough section, a rocking shoe disposed in advance of said reciprocating trough section for supporting the forward end of said trough section above the ground, an extensible trough section adapted to be extended from or nested within said reciprocating trough section, a carrier member disposed in advance of said rocking shoe and adapted to be supported by said extensible trough section including a pair of friction grip blocks pivotally mounted therein and adapted to engage said extensible trough section above and below a portion thereof, and a connection from said rocking shoe to said carrier member for bringing said grip blocks into and out of engagement with said extensible trough section.

2. A feeding device in accordance with claim 1, wherein the carrier member is pivotally connected to an adjusting lever which is adapted to adjust the angular position thereof and position said blocks to extend or retract said extensible trough section and wherein said adjusting lever is pivoted for movement about an axis disposed beneath and slidably movable with respect to said extensible trough.

3. A feeding device in accordance with claim 1, wherein the carrier member is pivotally connected to an adjusting lever which is adapted to adjust the angular position thereof and position said blocks to extend or retract said extensible trough section, and wherein yieldable means are interposed between said carrier member and adjusting lever to hold said parts in the desired relationship with respect to each other.

4. A feeding device in accordance with claim 1, wherein the carrier member is pivotally connected to an adjusting lever which is adapted to adjust the angular position thereof and position said blocks to extend or retract said extensible trough sections, wherein yieldable means are interposed between said carrier member and adjusting lever to hold said parts in the desired relationship with respect to each other, and wherein said adjusting lever is pivoted for movement about an axis disposed beneath and slidably movable with respect to said extensible trough.

5. A feeding device in accordance with claim 1, wherein the connection between said rocking shoe and carrier member includes a link and wherein means are provided for locking said grip blocks in engagement with said trough section which comprise means for elevating the rearward end of said link.

6. In a feeding device for shaker conveyers, a reciprocating trough section, a rocking shoe for supporting the forward end of said trough section above the ground, an extensible trough section adapted to be extended from or nested within said reciprocating trough section, and means connected to said rocking shoe and actuated by rocking movement thereof for extending or retracting said extensible trough section with respect to said reciprocating trough section comprising a carrier member having a pair of friction grip blocks pivotally mounted therein adapted to engage said extensible trough section above and below a portion thereof, a link connecting said rocking shoe to said carrier member for rocking said carrier member and engaging said grip blocks with said extensible trough section, and means for adjusting the position of said carrier member to position said blocks to extend or retract said extensible trough section.

7. In a feeding device for shaker conveyers, a reciprocating trough section, a rocking shoe for supporting the forward end of said trough section above the ground, an extensible trough section adapted to be extended from or nested within said reciprocating trough section, and means connected to said rocking shoe and actuated by rocking movement thereof for extending or retracting said extensible trough section with respect to said reciprocating trough section comprising a carrier member having a pair of friction grip blocks pivotally mounted therein adapted to engage said extensible trough section above and below a portion thereof, a link connecting said rocking shoe to said carrier member for rocking said carrier member and engaging said grip blocks with said extensible trough section, and means for adjusting the position of said carrier member to position said blocks to extend or retract said extensible trough section comprising an adjusting lever pivotally connected to said carrier member for movement about an axis coaxial with the axis of pivotal connection of said lower grip block thereto.

8. In a feeding device for shaker conveyers, a reciprocating trough section, a rocking shoe for supporting the forward end of said trough section above the ground, an extensible trough section adapted to be extended from or nested within said reciprocating trough section, and means connected to said rocking shoe and actuated by rocking movement thereof for extending or retracting said extensible trough section with respect to said reciprocating trough section comprising a carrier member having a pair of friction grip blocks pivotally mounted therein adapted to engage said extensible trough section above and below a portion thereof, a link connecting said rocking shoe to said carrier member for rocking said carrier member and engaging said grip blocks with said extensible trough section, and means for adjusting the position of said carrier member to position said blocks to extend or retract said extensible trough section comprising an adjusting lever pivotally connected to said carrier member and having pivotal and slidable engagement with the under surface of said extensible trough section.

9. In a feeding device for shaker conveyers, a reciprocating trough section, a rocking shoe for supporting the forward end of said trough section above the ground, an extensible trough section adapted to be extended from or nested within said reciprocating trough section, and means connected to said rocking shoe and actuated by rocking movement thereof for extending or retracting said extensible trough section with respect to said reciprocating trough section comprising a carrier member having a pair of friction grip blocks pivotally mounted therein and adapted to engage said extensible trough section above and below a portion thereof, a link connecting said rocking shoe to said carrier member for rocking said carrier member and engaging said grip blocks with said extensible trough section, means for positioning said blocks to extend or retract said extensible trough section comprising an adjusting lever pivotally connected to said carrier member for movement about an axis coaxial with the axis of pivotal connection of said lower grip block thereto, and a tension spring interposed between the upper end of said carrier member and said adjusting lever for holding said carrier member and adjusting lever in adjusted relationship with respect to said extensible trough section.

10. In a feeding device for shaker conveyers, a reciprocating trough section, a rocking shoe for supporting the forward end of said trough section above the ground, an extensible trough section adapted to be extended from or nested within said reciprocating trough section, and means connected to said rocking shoe and actuated by rocking movement thereof for extending or retracting said extensible trough section with respect to said reciprocating trough section comprising a carrier member having a pair of friction grip blocks pivotally mounted therein and adapted to engage said extensible trough section above and below a portion thereof, a link connecting said rocking shoe to said carrier member for rocking said carrier member and engaging said grip blocks with said extensible trough section, and means for positioning said blocks to extend or retract said extensible trough section comprising an adjusting lever pivotally connected to said carrier member and having pivotal and slidable engagement with the under surface of said extensible trough section, and a tension spring interposed between said carrier member and adjusting lever to hold said parts in the desired relationship with respect to each other.

11. In a feeding device for shaker conveyers, a reciprocating trough section, a rocking shoe for supporting the forward end of said trough section above the ground, an extensible trough section adapted to be extended from or retracted with respect to said reciprocating trough section, and means connected to said rocking shoe and actuated by rocking movement thereof for extending or retracting said extensible trough section with respect to said reciprocating trough section comprising a carrier member disposed on each side of said extensible trough section in advance of said rocking shoe, each of said carrier members having a pair of friction grip blocks pivotally mounted therein and adapted to engage the upper and lower surfaces of bearing plates extending laterally from said extensible trough section, connecting links for pivotally connecting the upper portion of said carrier members with said rocking shoe whereby said rocking shoe may rock said carrier members and bring said grip blocks into and out of engagement with said bearing plates, an adjusting lever pivotally connected to each of said carrier members for positioning said blocks to extend or retract said extensible trough section, and a connection between said adjusting levers to permit simultaneous operation thereof.

12. In a feeding device for shaker conveyers, a reciprocating trough section, a rocking shoe for supporting the forward end of said trough section above the ground, an extensible trough section adapted to be extended from or retracted with respect to said reciprocating trough section, and means connected to said rocking shoe and actuated by rocking movement thereof for extending or retracting said extensible trough section with respect to said reciprocating trough section comprising a carrier member disposed on each side of said extensible trough section in advance of said rocking shoe, each of said carrier members having a pair of friction grip blocks pivotally mounted therein and adapted to engage the upper and lower surfaces of bearing plates extending laterally from said extensible trough section, connecting links for pivotally connecting said carrier members with said rocking shoe whereby said rocking shoe may rock said carrier members and bring said grip blocks into and out of engagement with said bearing plates, an adjusting lever pivotally connected to each of said carrier members for positioning said blocks to extend or retract said extensible trough section, and a connection between said adjusting levers to permit simultaneous operation thereof including means engaging the under surface of said extensible trough and affording a slidable pivotal reaction means for said adjusting levers.

13. In a feeding device for shaker conveyers, a reciprocating trough section, a rocking shoe for supporting the forward end of said trough section above the ground, an extensible trough section adapted to be extended from or retracted with respect to said reciprocating trough section, a carrier member disposed on each side of said extensible trough section in advance of said rocking shoe, each of said carrier members having a pair of friction grip blocks pivotally mounted therein adapted to engage the upper and lower surfaces of bearing plates extending laterally from said extensible trough section, connecting links for pivotally connecting said carrier members with said rocking shoe whereby said rocking shoe may rock said carrier members and bring said grip blocks into and out of engagement with said bearing plates, an adjustable lever pivotally connected to each of said carrier members for positioning said blocks to extend or retract said extensible trough section, a connection between said adjusting levers to permit simultaneous operation thereof including means engaging the under surface of said extensible trough and affording a slidable pivotal reaction means for said adjusting levers, and yieldable means connected between said carrier members and adjusting levers for holding said carrier members in adjusted relation with respect to each other.

14. In a feeding device for shaker conveyers, a reciprocating trough section, a rocking shoe for supporting the forward end of said trough section above the ground, an extensible trough section adapted to be extended from or retracted with respect to said reciprocating trough section, a carrier member disposed on each side of said extensible trough in advance of said rocking shoe, each of said carrier members having a pair of friction grip blocks pivotally mounted therein adapted to engage the upper and lower surfaces of bearing plates extending laterally from said extensible trough section, connecting links for pivotally connecting said carrier members with said rocking shoe whereby said rocking shoe may rock said carrier members and bring said grip blocks into and out of engagement with said bearing plates, an adjusting lever pivotally connected to each of said carrier members at the point of connection of said lower grip blocks thereto, and a connection between said adjusting levers to permit simultaneous operation thereof including means engaging the under surface of said extensible trough and affording a slidable pivotal reaction means for said adjusting levers, yieldable means interposed between the upper ends of said carrier members and said adjusting levers for holding said carrier members in adjusted relation with respect to said extensible trough section, and means for locking said grip blocks in engagement with said bearing plates comprising means for elevating the rearward ends of said links to a position coaxial with the axis of rocking movement of said shoe.

15. In a feeding device for shaker conveyers, a reciprocating trough section, a rocking shoe adapted to support the forward end of said trough section above the ground, an extensible trough section adapted to be extended from or retracted with respect to said reciprocating trough section, and means actuated by rocking movement of said rocking shoe for extending or retracting said extensible trough section with respect to said reciprocating trough section comprising a carrier member having a pair of friction grip blocks pivotally mounted therein adapted to engage said extensible trough section above and below a portion thereof, a link connecting said rocking shoe to said carrier member for rocking said carrier member and bringing said grip blocks into and out of engagement with said trough section, and means for locking said grip blocks in engagement with said extensible trough section comprising an abutment on said carrier member adapted to be engaged by said link and means on said shoe for elevating the rearward end of said link.

16. In a feeding device for shaker conveyers, a reciprocating trough section, a rocking shoe adapted to support the forward end of said trough section above the ground, an extensible trough section adapted to be extended from or retracted with respect to said reciprocating trough section, and means actuated by rocking movement of said rocking shoe for extending or retracting said extensible trough section with respect to said reciprocating trough section comprising a carrier member having a pair of friction grip blocks pivotally mounted therein adapted to engage said extensible trough section above and below a portion thereof, a link connecting said rocking shoe to said carrier member for rocking said carrier member and bringing said grip blocks into and out of engagement with said trough section, and means for locking said grip blocks in engagement with said extensible trough section comprising means on said rocking shoe for elevating the rearward end of said link so that its rearward pivotal axis is coaxial with the pivotal axis of said rocking shoe.

17. In a feeding device for shaker conveyers, a reciprocating trough section, a rocking shoe adapted to support the forward end of said trough section above the ground, an extensible trough section adapted to be extended from or retracted with respect to said reciprocating trough section, and means actuated by rocking movement of said rocking shoe for extending or retracting said extensible trough section with respect to said reciprocating trough section comprising a carrier member having a pair of friction grip blocks pivotally mounted therein for engagement with said extensible trough section above and below a portion thereof, a link connecting said rocking shoe to said carrier member for rocking said carrier member and bringing said grip blocks into and out of engagement with said trough section, and means for positioning said carrier member to extend or retract said extensible trough section comprising an adjusting lever pivotally connected to said carrier member and a compression spring interposed between the upper end of said carrier member and said adjusting lever for holding said parts in adjusted relationship with respect to each other, and means on said rocking shoe for locking said grip blocks in engagement with said extensible trough comprising a means for elevating said link so that its pivotal axis is coaxial with the pivotal axis of said rocking shoe.

18. In a feeding device for shaker conveyers, a reciprocating trough section, a bracket extending forwardly therefrom above the upper end thereof, a rocking shoe pivotally connected to said bracket and forming a means for supporting the forward end of said trough section above the ground, an extensible trough section telescopically extensible from said reciprocating trough section, and means actuated by rocking movement of said rocking shoe for extending or retracting said extensible trough section with respect to said reciprocating trough section comprising a pair of carrier members disposed forwardly of said rocking shoe, said carrier members having friction grip blocks pivotally mounted therein adapted to engage bearing plates extending laterally from opposite sides of said extensible trough section, a pair of links connecting said rocking shoe with said carrier members for rocking said carrier members and bringing said grip blocks into and out of engagement with said trough section, and a connection between the lower ends of said carrier members including a member slidably engaging the under portion of said extensible trough section.

19. In a feeding device for shaker conveyers, a reciprocating trough section, a bracket extending forwardly therefrom above the upper end thereof, a rocking shoe pivotally connected to said bracket and forming a means for supporting the forward end of said trough section above the ground, an extensible trough section telescopically extensible from said reciprocating trough section, and means actuated by rocking movement of said rocking shoe for extending or retracting said extensible trough section with respect to said reciprocating trough section comprising a pair of carrier members disposed forwardly of said rocking shoe, said carrier members having a pair of friction grip blocks pivotally mounted therein adapted to engage bearing plates extending laterally from opposite sides of said extensible trough section, a pair of parallel-spaced aligned links connecting said carrier members with said rocking shoe, a connection between said carrier members including a pair of adjusting levers pivotally connected to the lower ends thereof and a member connecting said adjusting levers together and reacting against the under surface of said extensible trough section.

20. In a feeding device for shaker conveyers, a reciprocating trough section, a bracket extending forwardly therefrom above the upper end thereof, a rocking shoe pivotally connected to said bracket and forming a means for supporting the forward end of said trough section above the ground, an extensible trough section telescopically extensible from said reciprocating trough section, and means actuated by rocking movement of said rocking shoe for extending or retracting said extensible trough section with respect to said reciprocating trough section comprising a pair of carrier members disposed forwardly of said rocking shoe, said carrier members having a pair of friction grip blocks pivotally mounted therein adapted to engage bearing plates extending laterally from said extensible trough section, a pair of parallel-spaced aligned links connecting said carrier members with said rocking shoe, a connection between said carrier members including a pair of adjusting levers pivotally connected to the lower ends of said carrier members and a member connecting said adjusting levers together and reacting against the under surface of said extensible trough section, and yieldable means interposed between the upper ends of said carrier members and lower portion of said adjusting levers for holding said levers and carrier members in adjusted relation with respect to each other.

21. In a feeding device for shaker conveyers, a reciprocating trough section, means for supporting the forward end of said reciprocating trough section above the ground, an extensible trough section adapted to be extended from or nested within said reciprocating trough section, means for extending or retracting said extensible trough section with respect to said reciprocating trough section including a carrier member having a pair of friction grip blocks pivotally mounted therein adapted to engage said extensible trough section above and below a portion thereof and a connection between said carrier member and reciprocating trough section and means for adjustably positioning said carrier member to position said blocks to extend or retract said extensible trough section comprising an adjusting lever pivotally connected to said carrier member for movement about an axis coaxial with the axis of pivotal connection of said lower grip block thereto, and a member extending transversely from said adjusting lever beneath said extensible trough section, and yieldable means for engaging said member with the underside of said extensible trough section to hold said member in engagement with the underside of said extensible trough section.

22. In a feeding device for shaker conveyers, a reciprocating trough section, means for supporting the forward end of said reciprocating trough section above the ground, an extensible trough section adapted to be extended from or nested within said reciprocating trough section, means for extending or retracting said extensible trough section with respect to said reciprocating trough section including a carrier member having a pair of friction grip blocks pivotally mounted therein adapted to engage said extensible trough section above and below a portion thereof and a connection between said carrier member and reciprocating trough section, and means for adjustably positioning said carrier member to position said blocks to extend or retract said extensible trough section comprising an adjusting lever pivotally connected to said carrier member and having a member extending transversely beneath said extensible trough section, and a spring connected between said carrier member and a lower side of said adjusting lever for engaging said member with the undersurface of said extensible trough section.

23. In a feeding device for shaker conveyers, a reciprocating trough section, means for supporting the forward end of said reciprocating trough section above the ground, an extensible trough section adapted to be extended from or nested within said reciprocating trough section, means for extending or retracting said extensible trough section with respect to said reciprocating trough section including a carrier member having a pair of friction grip blocks pivotally mounted therein adapted to engage said extensible trough section above and below a portion thereof, means for positioning said carrier member to position said blocks to extend or retract said extensible trough section comprising an adjusting lever pivotally connected to said carrier member for movement about an axis coaxial with the axis of pivotal connection of said lower grip block thereto, said carrier member extending above said upper grip block, and a tension spring interposed between said upwardly extending portion of said carrier member and the lower end of said adjusting lever beneath its axis of pivotal connection to said carrier member, for holding said carrier member and adjusting lever in adjusted relationship with respect to said extensible trough section.

24. In a feeding device for shaker conveyers, a reciprocating trough section, means for supporting the forward end of said reciprocating trough section above the ground, an extensible trough section adapted to be extended from or nested within said reciprocating trough section, and means for extending or retracting said extensible trough section with respect to said reciprocating trough section including a carrier member having a pair of friction grip blocks pivotally mounted therein adapted to engage said extensible trough section above and below a portion thereof, means for positioning said carrier member to position said blocks to extend or retract said extensible trough section comprising an adjusting lever pivotally connected to said carrier member and having a rotatable member extending from said adjusting lever transversely beneath said extensible trough section adapted to have pivotal slidable engagement with the undersurface of said extensible trough section, and a tension spring interposed between said carrier member and adjusting lever to hold said parts in the desired relationship with respect to each other.

25. In a feeding device for shaker conveyers, a reciprocating trough section having its forward end supported for reciprocable movement above the ground, an extensible trough section adapted to be extended from or retracted within said reciprocating trough section, means connected to said reciprocating trough section and actuated by reciprocable movement thereof for extending or retracting said extensible trough section with respect to said reciprocating trough section including a carrier member disposed on each side of said extensible trough section in advance of said reciprocating trough section, each of said carrier members having a pair of friction grip blocks pivotally mounted therein and adapted to engage the upper and lower surfaces of bearing plates extending laterally from said extensible trough section, connections from said carrier members to said reciprocating trough section, an adjusting lever pivotally connected to each of said carrier members for positioning said blocks to extend or retract said extensible trough section and having a portion depending from the axis of pivotal movement thereof to a point disposed beneath said conveyer trough, and a member connected between said depending portions and extending beneath said trough sections to permit said carrier members to be simultaneously adjusted from one side of said feeding device.

26. In a feeding device for shaker conveyers, a reciprocating trough section having its forward end supported for reciprocable movement above the ground, an extensible trough section adapted to be extended from or retracted within said reciprocating trough section, means connected to said reciprocating trough section for extending or retracting said extensible trough section with respect to said reciprocating trough section including a carrier member disposed on each side of said extensible trough section in advance of said reciprocating trough section, each of said carrier members having a pair of friction grip blocks pivotally mounted therein and adapted to engage the upper and lower surfaces of bearing plates extending laterally from said extensible trough section, connections from said carrier members to said reciprocating trough section, an adjusting lever pivotally connected to each of said carrier members for positioning said blocks to extend or retract said extensible trough section, and a connection between said adjusting levers to permit simultaneous operation thereof including a member connecting the lower ends of said adjusting members together and yieldable means for slidably engaging said member with the undersurface of said extensible trough permitting said member to afford a slidable pivotal reaction member for said adjusting levers.

27. In a feeding device for shaker conveyers, a reciprocating trough section having its forward end supported for reciprocable movement above the ground, an extensible trough section adapted to be extended from or retracted within said reciprocating trough section, means connected to said reciprocating trough section for extending or retracting said extensible trough section with respect to said reciprocating trough section including a carrier member disposed on each side of said extensible trough section in advance of said reciprocating trough section, each of said carrier members having a pair of friction grip blocks pivotally mounted therein and adapted to engage the upper and lower surfaces of bearing plates extending laterally from said extensible trough section, connections from said carrier members to said reciprocating trough section, an adjusting lever pivotally connected to each of said carrier members for positioning said blocks to extend or retract said extensible trough section, a member extending beneath said extensible trough section and slidably engaging the undersurface thereof for connecting said adjusting levers together and permitting simultaneous operation thereof upon operation of one of said levers, and a yieldable member interposed between the upper ends of said carrier members and said opposite ends of said members to hold said carrier members and adjusting levers in the desired position of adjustment with respect to each other.

ERNST R. BERGMANN.